United States Patent [19]

Larson et al.

[11] Patent Number: 4,571,327

[45] **Date of Patent: * Feb. 18, 1986**

[54] SOLID CAST DETERGENT DISPENSER WITH INSERT FOR HOLDING NONCOMPATIBLE CHEMICAL

[75] Inventors: Spencer B. Larson, Newport; Richard H. Johnson, West St. Paul; Thomas L. Hennemann, Jr., Woodbury; James L. Copeland, Burnsville, all of Minn.

[73] Assignee: Economics Laboratory, Inc., St. Paul, Minn.

[ * ] Notice: The portion of the term of this patent subsequent to Jan. 17, 2001 has been disclaimed.

[21] Appl. No.: 592,604

[22] Filed: Mar. 22, 1984

[51] Int. Cl.⁴ .............................................. B01D 11/02

[52] U.S. Cl. .................................... 422/263; 222/652; 422/264; 422/266

[58] Field of Search ............... 422/255, 261, 263, 264, 422/266, 267, 268, 236; 222/651, 652, 67; 239/57, 60

[56] References Cited

U.S. PATENT DOCUMENTS

| | | | |
|---|---|---|---|
| 2,686,080 | 8/1954 | Wood . | |
| 2,955,713 | 10/1960 | Colby | 210/450 |
| 3,104,816 | 9/1963 | Jaffe | 239/60 |
| 3,579,440 | 12/1969 | Bradley, Jr. | 422/264 |
| 3,612,080 | 10/1971 | Schneider, Jr. et al. | 422/263 |
| 3,850,185 | 11/1974 | Guth | 222/652 |
| 4,014,794 | 5/1977 | Lewis | 422/261 |
| 4,063,663 | 12/1977 | Larson et al. . | |
| 4,197,271 | 4/1980 | Fenstermaker et al. | 422/123 |
| 4,353,876 | 10/1982 | Ballu et al. | 422/263 |
| 4,426,362 | 1/1984 | Copeland et al. . | |
| 4,462,511 | 7/1984 | Fulmer et al. | 422/261 |

FOREIGN PATENT DOCUMENTS

| | | | |
|---|---|---|---|
| 8912 | of 1916 | United Kingdom | 422/263 |

*Primary Examiner*—David L. Lacey
*Assistant Examiner*—Titus B. Ledbetter, Jr.
*Attorney, Agent, or Firm*—Merchant, Gould, Smith, Edell, Welter & Schmidt

[57] ABSTRACT

A dispenser (10) for a detergent (13) is disclosed. A housing (10) defining an inner cavity (12) holds the detergent (13). The cavity (12) has a circular opening. An insert (14) of a substance not chemically compatible with the detergent (13) is retained in the opening of the inner cavity (12). The insert (14) is retained by retaining ring (20) and a cover (26). In a preferred embodiment, the retaining ring (20) defines an inner aperture (**21*a*) and has a plurality of generally upwardly extending resilient fingers (24) cooperatively connected to the retaining ring (20) proximate the inner aperture (21*b*). A cover (26) is cooperatively connected to and secured by the fingers (24), wherein said insert (14) is placed over said fingers (24) and said cover (26) over said insert (14), whereby said fingers (24) and said cover (26) control the dissolving of the insert (14) by controlling the surface area of the insert (14) exposed to the detergent solution. A spray forming nozzle (15) is mounted to and extends into the cavity (12) through the opening for directing a pressurized spray of liquid at the detergent. The hydraulic action of the nozzle directed spray (16) dissolves a portion of the detergent (13), forming a detergent solution which passes by gravity over the insert (14) and dissolves a portion of the insert (14**), and the detergent solution and dissolved insert are discharged through the opening.

8 Claims, 9 Drawing Figures

FIG. 2
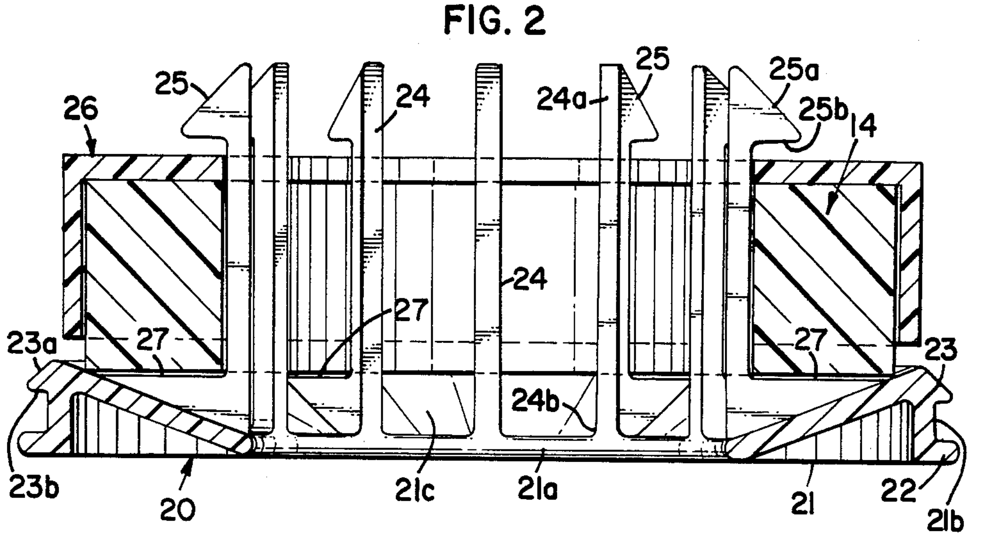
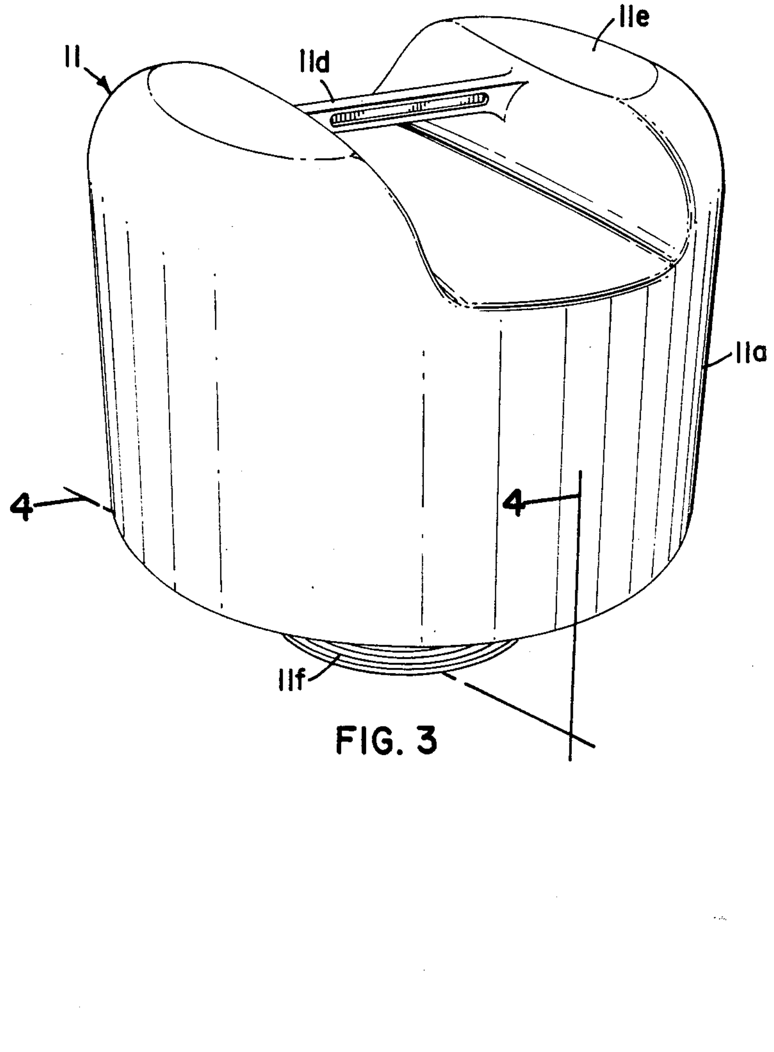
FIG. 3

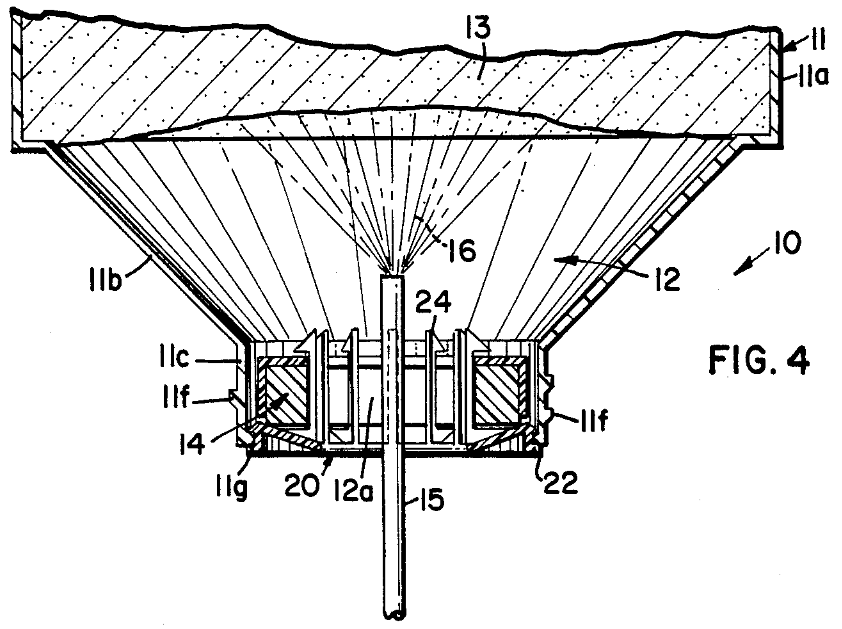
FIG. 4
FIG. 5
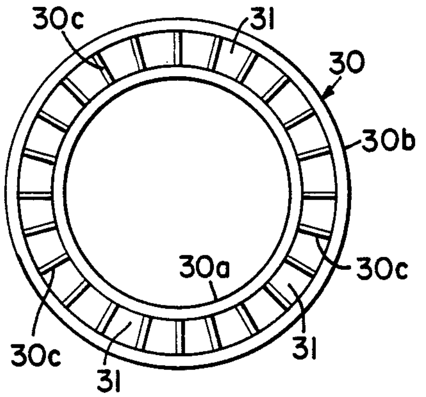
FIG. 6
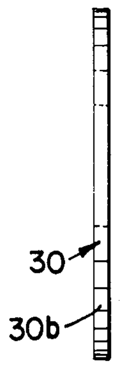

FIG. 7
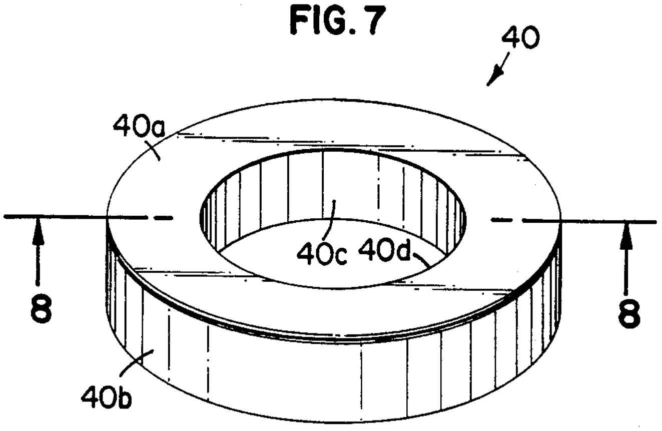
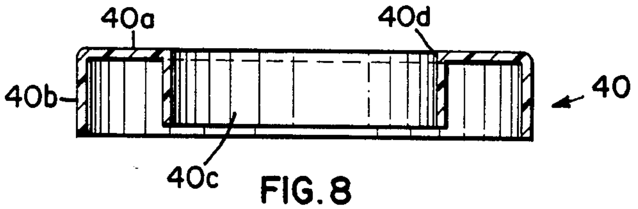
FIG. 8
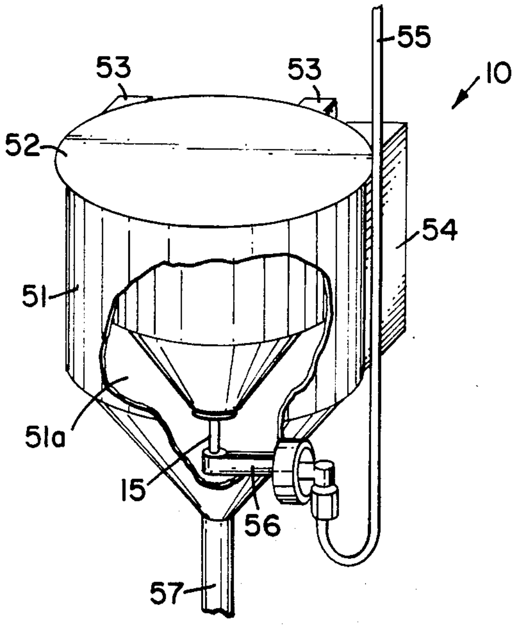
FIG. 9

SOLID CAST DETERGENT DISPENSER WITH INSERT FOR HOLDING NONCOMPATIBLE CHEMICAL

BACKGROUND OF THE INVENTION

1. Field of the Invention

This invention relates generally to a dispensing apparatus and more particularly to a dispensing apparatus which converts a solid cast detergent composition into a concentrated detergent solution, the solution then dissolving an incompatible chemical, such as chlorine.

2. Background of the Prior Art

Dispensing apparatus for converting a solid detergent to a detergent solution are well known in the art. One example of such an apparatus is shown in U.S. Pat. No. 2,686,080 issued to Bennie Wood. In this dispensing apparatus, a solid mass of cleaning substance that is soluble in water is eroded from the lower end of the cleaning substance by applying water that is to be treated, under pressure, to the periphery of the cleaning substance. This causes the cleaning substance to be dissolved and placed in solution with the pressurized water.

In the Woods dispenser, the substance being dispensed was one solid substance. However, in many instances, it is desirable to dispense two substances at the same time. This is quite difficult to do when the two substances are incompatible. One apparatus for dispensing two noncompatible chemicals is disclosed in U.S. Pat. No. 4,426,362 issued Jan. 17, 1984 to James L. Copeland et al, and assigned to the assignee of the present invention. This dispensing apparatus discloses a receptacle of the cartridge type which may have separate cores or pockets for retaining a second composition. The second composition may be incompatible with the first or major composition to be dispensed. The water spray impinges upon both the first and second substance, thereby dissolving both substances. In addition, the second substance is dissolved as the water cascading from the first substance crosses the second substance as it is exiting the apparatus. Incorporating such separate pockets or cores into a detergent that has been cast into a bottle presents additional problems over those solved by the invention of U.S. Pat. No. 4,426,362.

The present invention addresses these problems and provides for a means for retaining an insert of a noncompatible chemical for use in a cast detergent dispenser.

SUMMARY OF THE INVENTION

A dispenser for a detergent is disclosed. The dispenser includes a housing defining an inner cavity. The cavity has a circular opening and detergent is held in the inner cavity. An insert of a substance not chemically compatible with the detergent is also provided. Means for retaining the insert in the opening of the inner cavity is also provided. A spray forming nozzle means is mounted to extend into the cavity through the opening for directing a pressurized spray of liquid at the detergent, such that the hydraulic action of the nozzle directed spray dissolves a portion of the detergent, forming a detergent solution which passes by gravity over the insert and dissolves a portion of the insert, and the detergent solution and dissolved insert are discharged through the opening.

In a preferred embodiment, the retaining means includes a retaining ring that engages the opening and supports the insert in the opening. The ring defines an inner aperture. A plurality of generally upwardly extending resilient fingers are cooperatively connected to the retaining ring proximate the inner aperture. A cover is cooperatively connected to and secured by the fingers, wherein the insert is placed over the fingers and the cover over the insert, whereby said fingers and said cover control the dissolving of said insert by controlling the surface area of said insert exposed to the detergent solution.

BRIEF DESCRIPTION OF THE DRAWINGS

FIG. 2 is a cross-sectional view of the retaining ring of FIG. 1, taken generally along the lines 2—2.

FIG. 3 is a perspective view of a container according to the present invention as generally viewed from above.

FIG. 4 is a cross-sectional view of the dispenser of FIG. 3, taken generally along the lines 4—4.

FIG. 5 is a top plan view of a second embodiment according to the present invention of a cover for the retaining ring.

FIG. 6 is a side elevational view of the cover as shown in FIG. 5.

FIG. 7 is a perspective view of a third embodiment according to the present invention of a cover for the retaining ring.

FIG. 8 is a cross-sectional view of the cover of FIG. 7, taken generally along the lines 8—8.

FIG. 9 is a perspective view of a dispenser according to the present invention as generally viewed from above.

DETAILED DESCRIPTION OF THE INVENTION

Figure 1:
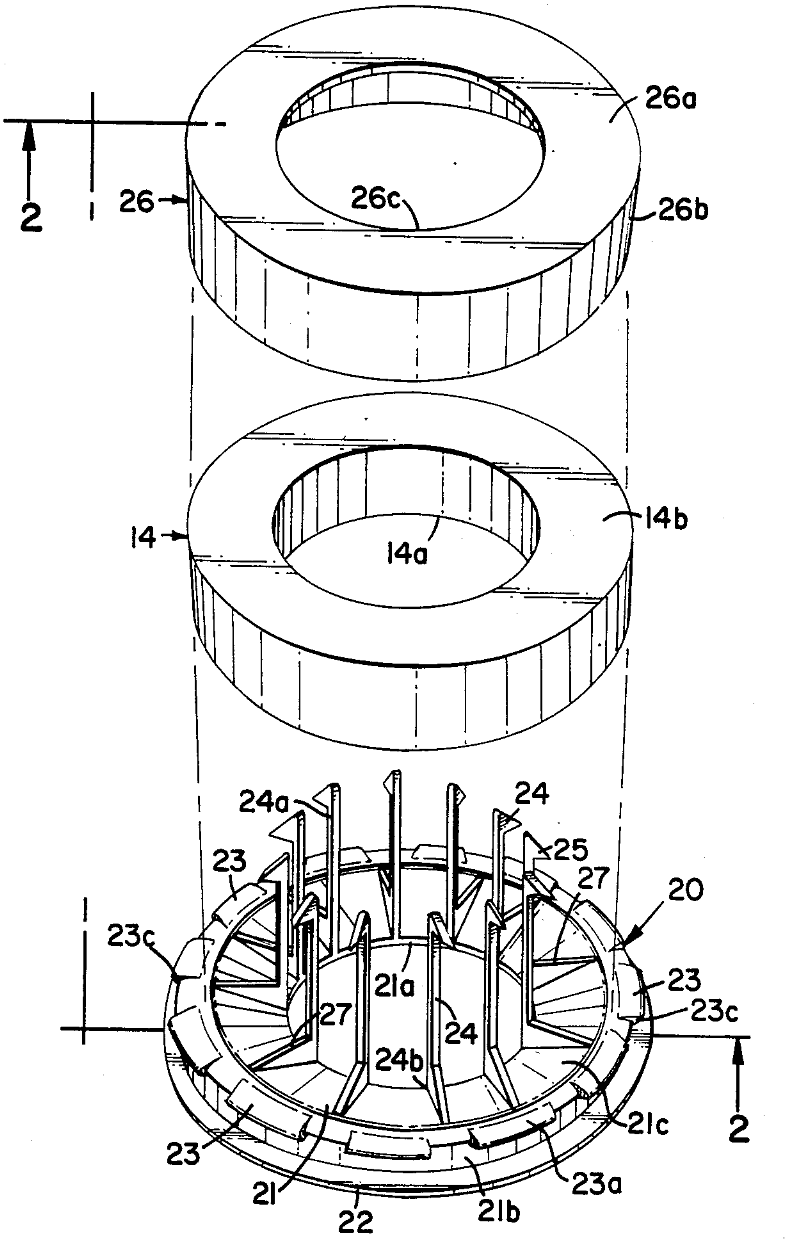
FIG. 1 is an exploded perspective view of a retaining ring and chlorine insert constructed according to this invention as generally viewed from above.

Referring to the drawings, wherein like numerals represent like element throughout the several views, there is generally designated as 10, a dispenser. As shown in FIG. 9, the dispenser 10 has an outer housing 51 having an inner cavity 51*a*. There is access to the top portion of the inner cavity 51*a* through a hinged lid 52. The hinged lid is cooperatively connected to the housing by suitable hinges 53. A mounting member 54 is cooperatively connected to the housing 51. The mounting member 54 may then be used to mount the dispenser 10 to an appropriate surface. A water supply line 55 brings a supply of water to a nozzle 15. The nozzle 15 held in place by means of a nozzle holder 56 that is cooperatively connected through an opening in the housing 51. At the bottom of the cavity 51*a*, a discharge tube 57 is cooperatively connected to the housing 51. The dispenser 10 includes a container 11 having an inner cavity 12 with an opening 12*a*. A first substance 13 is carried in the inner cavity 12. As will be more fully described hereafter, the first substance 13 may be a cast detergent. The container 11 is generally cylindrical having generally upright sidewalls 11*a* cooperatively connected by a funnel section 11*b* to a circular collar 11*c*. A handle 11*d* may be formed in the base 11*e* of the container 11. In a preferred embodiment, the container 11 is of a one piece construction and is manufactured by blow molding. On the outside surface of the collar 11*c* are formed outer screw threads 11*f*. On the inner surface of the collar 11*c* is formed an inner lip 11*g*. The screw threads 11*f* are adapted to receive a cap (not shown).

A second substance 14, chemically incompatible with the first substance 13, is retained in the collar section 11*c* of the container 11. In a preferred embodiment, the second substance 14 is in the general shape of a circular cylinder having an opening in its center. The second substance 14 has an inner opening 14*a*.

The retaining means includes a retaining ring, generally designated as 20. The retaining ring includes a base 21 having an inner aperture 21*a*. Cooperatively connected to the base 21 is a flange 22. Also cooperatively connected to the base 21 are locking members 23. The locking members 23 have a top surface 23*a* that extends generally downward and outward. The locking member 23 also has a generally horizontal bottom surface 23*b* that extends outwardly past the base 21. The side 23*c* of the locking member 23 is generally vertical. The base 21 includes a generally upwardly extending circular sidewall 21*b* and a generally inwardly and downwardly sloping top surface 21*c*. Preferably, the retaining ring 20, including the base 21, flange 22 and locking members 23 are formed as an integral unit and are preferably made from a plastic by injection molding.

Cooperatively connected to the retaining ring 20 at the inner aperture 21*a* of the base 21*b* are a plurality of generally upwardly extending fingers 24 having a top end 24*a* and a bottom end 24*b*. In a preferred embodiment, the bottom end 24*b* is cooperatively connected to the base 21. Cooperatively connected to the top end 24*a* is a hook member 25. The hook member 25 has a generally outwardly and downwardly extending top surface 25*a* and a generally horizontal bottom surface 25*b*. Cooperatively connected to the fingers 24 are ramps 27 that form a horizontal surface that holds the second substance 14 up and away from a flowing top surface 21*c*.

A cover 26 has a top surface 26*a* cooperatively connected to sides 26*b*. The top surface 26*a* has an inner aperture 26*c*. As can be seen in FIG. 1, the cover 26 is generally circular and corresponds to the general shape of the second substance insert 14 and retaining ring 20. Similar to the retaining 20, the cover 26 is preferably of a single piece construction and is made of a plastic material.

The insert 14 has an inner opening 14*a* sized slightly larger than the diameter formed by the outer surface of the fingers 24. However, the inner opening 14*a* is less than the diameter formed by the hook members 25. Therefore, when the insert 14 is placed over the top of the hook members 25, the inner aperture 14*a* bends the fingers 24 inward, allowing the insert 14 to drop over the hook members 25. Once the top surface of the insert 14 is past the bottom surface 25*b* of the hook members 25, the hook members, being resilient, will spring back to their original position. The bottom surface 25*b* of the hook members 25 will now hold the insert 14 in position.

The cover 26 is then placed on top of the chlorine insert. The inner aperture 26*c* of the cover 26 is less than the diameter formed by the hook members 25. Therefore, when the cover 26 is placed over the top of the hook members 25, the inner aperture 26*c* bends the fingers 24 inward, allowing the cover 26 to drop over the hook members 25. Once the top surface 26*a* of the cover 26 is past the bottom surface 25*b* of the hook members 25, the hook members, being resilient, will spring back to their original position. The cover 26 is then in position over the insert 14 and the bottom surface 25*b* of the hook members 25 will now hold the cover 26, and therefore the insert 14 in position.

A second embodiment of a cover is shown in FIGS. 5 and 6. The cover 30 has an inner ring 30*a* connected to an outer ring 30*b* by a plurality of ribs 30*c*. Openings 31 are formed between the ribs 30*c*. The cover 30 is in the general shape of a disc. As will be more fully discussed hereafter, depending upon the rate of dissolving of the insert 14 desired, either cover 26 or 30 may be used.

A third embodiment of a cover is shown in FIGS. 7 and 8. The cover 40 is similar to the cover 46 with the addition of an inner side 40*c*. The cover 40 has a top surface 40*a* that has cooperatively connected to it a downwardly depending outer side 40*b* and a downwardly depending inner side 40*c*. The inner side 40*c* forms an inner aperture 40*d*.

One example of a cast detergent 13 that may be used with the present invention is disclosed in U.S. application Ser. No. 234,940, filed Feb. 17, 1981 by Peter J. Fernholz et al and is hereby incorporated by reference. The solid cast detergent composition contains an alkaline hydratable chemical comprising an alkali metal hydroxide, a hardness-sequestering agent, and more than 15 parts by weight, by 100 parts by weight of said alkaline hydratable chemical, of water of hydration, at least a portion of the water of hydration being associated with the alkali metal hydroxide.

The chlorine insert 14 may be of any suitable chlorine source that is compatible, such as trichloroisocyanurate.

In operation, the cast detergent is cast into the container 11. Then, the retaining means 20, holding the chlorine insert 14 is inserted into the inner lip 11*g* of the container 11. There is a snap in action which retains the retaining means 20 with the inner lip 11*g*. As can be seen in FIG. 4, after the retaining ring 20 is snapped into position, the inner lip 11*g* is positioned between the flange 22 and bottom 23*b* of the locking member 23. The outer diameter formed by the locking member 23 is larger than the inner diameter of the inner lip 11*g*. As the retaining ring 20 is snapped into position, the inner lip 11*g* deforms outward, allowing the locking members 23*a* to pass by the inner lip 11*g*. After the locking members 23 have passed the inner lip 11*g*, the inner lip 11*g* snaps back into position. While a liquid-tight seal is not required, a liquid-tight seal may be obtained by sonic welding of the retainer ring 20 to the collar 11*c*. If sonic welding is used, the inner lip 11*g* is not needed. A cap, not shown, is then screwed onto the threads 11*f* and the container 11, is then ready for shipment to the customers. When a container of detergent is required by the customer, the customer simply unscrews the cap from the screw threads 11*f*. Then, holding the handle 11*d*, the container is inverted and lowered into position over a spray nozzle 15. The spray nozzle 15 extends into the funnel section 11*b* of the container 11.

When required, by appropriate control means (not shown), a liquid, preferably water, is directed through the water supply line 55 under pressure out of the spray nozzle 15 and impinges upon the detergent 13. It is also well known in the art how to suitably control the water being emitted from the spray nozzle 15. As the pressurized water impinges upon the exposed surfaces of the detergent 13 and dissolves by means of the hydraulic action of the spray itself a portion of the detergent 13, at the exposed surfaces. After striking the exposed surface of the detergent 13, the spray and dissolved detergent form a concentrated detergent solution which passes by gravity downwardly through the funnel section 11*b* of the container 11. The concentrated detergent solution then passes over the cover 26 through the inner aperture 26*a* and cascades across the chlorine insert 14. The concentrated solution thereby dissolves a portion of the chlorine insert 14 and the concentrated detergent solution, now containing chlorine, passes out of the container 11. The concentrated detergent solution and chlorine is then collected either directly into an underlying wash tank reservoir or by appropriate conduit means for transfer to an appropriate reservoir.

The cover 26 regulates the amount of concentrated detergent solution that is able to pass over and in contact with the chlorine insert 14. In addition, the fingers 24 will also control the dissolving rate especially when the container 11 is first used. The greater number of fingers 24, the less surface area of the chlorine is available. As the chlorine is dissolved and becomes smaller the detergent solution will more easily pass behind the fingers 24 and in front of the insert 14, allowing for more exposed surface of the insert 14. By controlling the amount of the chlorine insert 14 that is exposed to the concentrated detergent solution, the dissolving rate of the chlorine insert can be controlled. Ideally, in a preferred embodiment, as the last of the detergent 13 is dissolved by the spray of liquid 16, the last of the chlorine insert 14 is also dissolved by the concentrated detergent solution. Therefore, there is always chlorine available for the concentrated detergent solution, but the chlorine is completely used up when the detergent is used up. Due to environmental concerns, it is important that the chlorine insert be completely used, so that there are no problems associated with disposing of the container 11. The second embodiment of the cover, as shown in FIGS. 5 and 6, provides for more of the chlorine insert 14 to be exposed to the dissolving action of the concentrated detergent solution. The openings 31 allow the concentrated detergent solution to cascade not only across the inner aperture of the chlorine insert, but also across the top surface 14*b* of the chlorine insert. Since more of the chlorine insert is exposed, the rate of dissolving will be greater. The third embodiment of the cover, as shown in FIGS. 7 and 8, has its inner side 40*c* that would shield the second material 14 from the fingers 24. Therefore, the fingers 24 would not assist in controlling the dissolving rate, but the inner side 40*c* would. It is understood that based on the specific composition of the detergent and chlorine, it will be necessary to vary the amount of exposed surface of the chlorine insert 14 to provide for a dissolving rate of the chlorine insert that will use up all of the chlorine insert before the detergent 13 is completely used.

In a preferred embodiment, the container 11 is installed horizontal. This will provide for the even cascading of the concentrated detergent solution down and around the funnel section 11*b* and across the chlorine insert 14. The circular shape of the container and funnel section, in combination with the circular shape of the insert 14 provides for an even dissolving rate of the chlorine insert 14 which can be controlled by the amount of surface area of the chlorine insert 14 exposed. Since the dissolving is even around the entire circle, the rate of dissolving can be more closely controlled, thereby allowing the chlorine insert 14 to be used up at substantially the same time or shortly before the detergent 13 is used.

Other modifications of the invention will be apparent to those skilled in the art in light of the foregoing description. This description is intended to provide specific examples of individual embodiments which clearly disclose the present invention. Accordingly, the invention is not limited to these embodiments or to the use of elements having specific configurations and shapes as presented herein. All alternative modifications and variations of the present invention which follows in the spirit and broad scope of the appended claims are included.

We claim:

1. A dispenser for a detergent, comprising:

(a) a housing defining an inner cavity, said housing having a funnel section leading downwardly to a collar at a lower end thereof and having a circular opening, a body of liquid soluble detergent located within said inner cavity and positioned above and spaced apart from said collar;

(b) a liquid soluable insert, located within said collar, of a substance not chemically compatible with the detergent, said insert having an inner opening;

(c) means for retaining said insert in said circular opening, said retaining means having an aperture; and (d) spray-forming nozzle means mounted to extend into said cavity through said circular opening, said aperture and said inner opening, whereby a pressurized spray of liquid is directed towards the detergent, such that hydraulic action of said nozzle directed spray dissolves a portion of the detergent, and forms a detergent solution which passes by gravity over said insert and dissolves a portion of said insert, and whereby the detergent solution and dissolved insert are discharged out of said circular opening through said aperture.

2. The dispenser of claim 1, wherein said retaining means is made from plastic.

3. The dispenser of claim 1, wherein said retaining means comprises:

(a) a retaining ring, said ring engages said opening and supports said insert in said opening, said ring defining said aperture;

(b) a plurality of generally upwardly extending resilient fingers cooperatively connected to said retaining ring and proximate said aperture; and (c) a cover having an inner aperture cooperatively connected to and secured by said fingers, wherein said insert is placed over said fingers and said cover over said insert, whereby said fingers and said cover control the dissolving of said insert by controlling the surface area of said insert exposed to the detergent solution.

4. The dispenser of claim 3, wherein said fingers comprise:

(a) a flexible upright member having a top end and bottom end, said bottom end cooperatively connected to said retaining ring; and (b) a hook portion cooperatively connected to said top end having a top surface extending generally downward and outward.

5. The dispenser of claim 3, wherein said retaining ring further comprises a plurality of locking members and a flange both cooperatively connected to said ring, whereby said retaining ring is locked in position in said opening by said locking members and said flange.

6. The dispenser of claim 3, wherein said cover has a top surface cooperatively connected to side walls and said top surface has said inner aperture.

7. The dispenser of claim 3, wherein said cover has an inner ring cooperatively connected to an outer ring by a plurality of ribs, said cover being in a general shape of a disc.

8. A dispenser for a detergent, comprising:

(a) a housing defining an inner cavity, said housing having a funnel section leading downwardly to a collar at a lower end thereof and having a circular opening, a body of liquid soluble detergent located within said inner cavity and positioned above and spaced apart from said collar;

(b) a liquid soluable insert, located within said collar, of a substance not chemically compatible with the detergent, said insert having an inner opening;

(c) means for retaining said insert in said circular opening of said inner cavity, said retaining means comprising:

(i) a retaining ring, said ring engages said opening and supports said insert in said opening, said ring defining an inner aperture;

(ii) a plurality of generally upwardly extending resilient fingers cooperatively connected to said retaining ring and proximate said inner aperture;

(iii) a cover having an inner aperture cooperatively connected to and secured by said fingers, wherein said insert is placed over said fingers and said cover over said insert, whereby said fingers and said cover control the dissolving of said insert by controlling the surface area of said insert exposed to the detergent solution; and (iv) a plurality of locking members and a flange both cooperatively connected to said ring, whereby said retaining ring is locked into position in said opening by said locking members and flange; and (d) spray-forming nozzle means mounted to extend into said cavity through said circular opening, said inner apertures and said inner opening, whereby a pressurized spray of liquid is directed towards the detergent, such that hydraulic action of said nozzel directed spray dissolves a portion of the detergent, and forms a detergent solution which passses by gravity over said insert and dissolves a portion of said insert, and whereby the detergent solution and dissolved insert are discharged out of said circular opening through said inner aperture.

* * * * *